United States Patent
Eguchi

(10) Patent No.: US 7,750,592 B2
(45) Date of Patent: Jul. 6, 2010

(54) AXIS-OF-ROTATION POSITION CONTROL DEVICE

(75) Inventor: Satoshi Eguchi, Aichi (JP)

(73) Assignee: Okuma Corporation, Niwa-Gun, Aichi (JP)

( * ) Notice: Subject to any disclaimer, the term of this patent is extended or adjusted under 35 U.S.C. 154(b) by 393 days.

(21) Appl. No.: 11/969,090

(22) Filed: Jan. 3, 2008

(65) Prior Publication Data

US 2008/0169778 A1  Jul. 17, 2008

(30) Foreign Application Priority Data

Jan. 11, 2007  (JP)  ............................ 2007-003064

(51) Int. Cl.
*G05B 13/04*  (2006.01)
*G05D 3/12*  (2006.01)

(52) U.S. Cl. ........................ 318/561; 318/569; 318/601; 318/632

(58) Field of Classification Search ................. 318/560, 318/561, 563, 569, 600, 601, 619, 621, 632
See application file for complete search history.

(56) References Cited

U.S. PATENT DOCUMENTS

| | | | | |
|---|---|---|---|---|
| 4,890,046 | A | * | 12/1989 | Kurakake et al. ............ 318/630 |
| 4,994,978 | A | * | 2/1991 | Kawamura et al. .......... 700/188 |
| 5,172,040 | A | * | 12/1992 | Sasaki et al. ................. 318/571 |
| 6,184,644 | B1 | | 2/2001 | Eguchi |
| 6,190,098 | B1 | * | 2/2001 | Fujita et al. ................. 409/132 |
| 6,861,816 | B2 | | 3/2005 | Eguchi |

FOREIGN PATENT DOCUMENTS

| JP | 3351990 | 9/2002 |
|---|---|---|
| JP | 2002-366230 | 12/2002 |
| JP | 2003-323216 | 11/2003 |

OTHER PUBLICATIONS esp@cenet patent abstract for Japanese Publication No. 2002366230, Publication date Dec. 20, 2002 (1 page).
esp@cenet patent abstract for Japanese Publication No. 10326114, Publication date Dec. 8, 1998 (1 page) Corresponds to JP-3351990).
esp@cenet patent abstract for Japanese Publication No. 2003323216, Publication date Nov. 14, 2003 (1 page).

* cited by examiner

*Primary Examiner*—Bentsu Ro
(74) *Attorney, Agent, or Firm*—Osha • Liang LLP

(57) ABSTRACT

When performing numerical control of a rotary table, the moment of inertia and the center of gravity of a control target change because of a placed object fixed onto the rotary table. A rotary table to which a placed object has been fixed serves as a target plant, the actual motion of this is compared with motion calculated by an identification model of the target plant, and a torque command value is corrected. The identification model comprises a term pertaining to angular acceleration and a term pertaining to angle of rotation, and by including the term pertaining to angle of rotation, correction of a torque command corresponding to a change in the center of gravity can be performed.

4 Claims, 4 Drawing Sheets

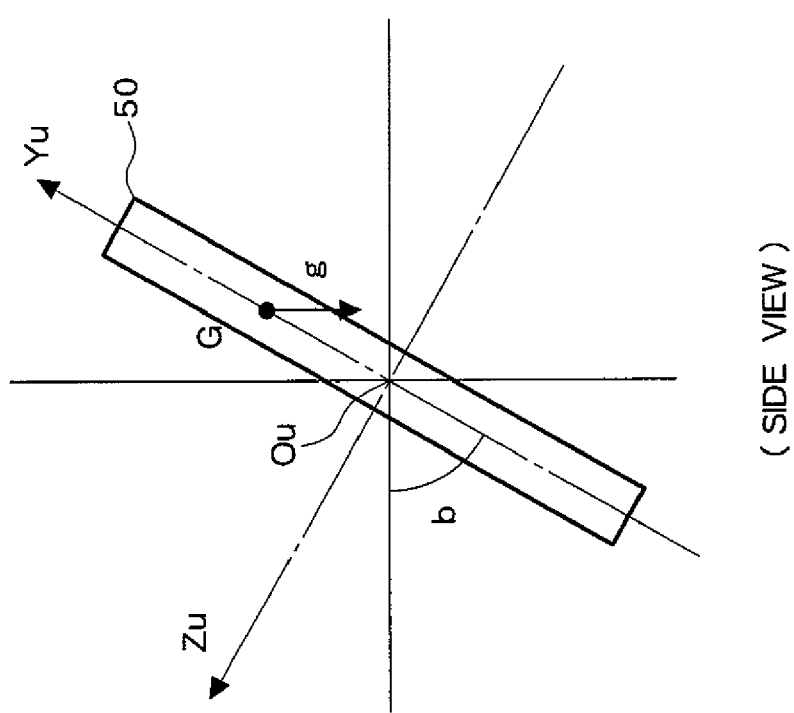
Fig. 3B (SIDE VIEW)
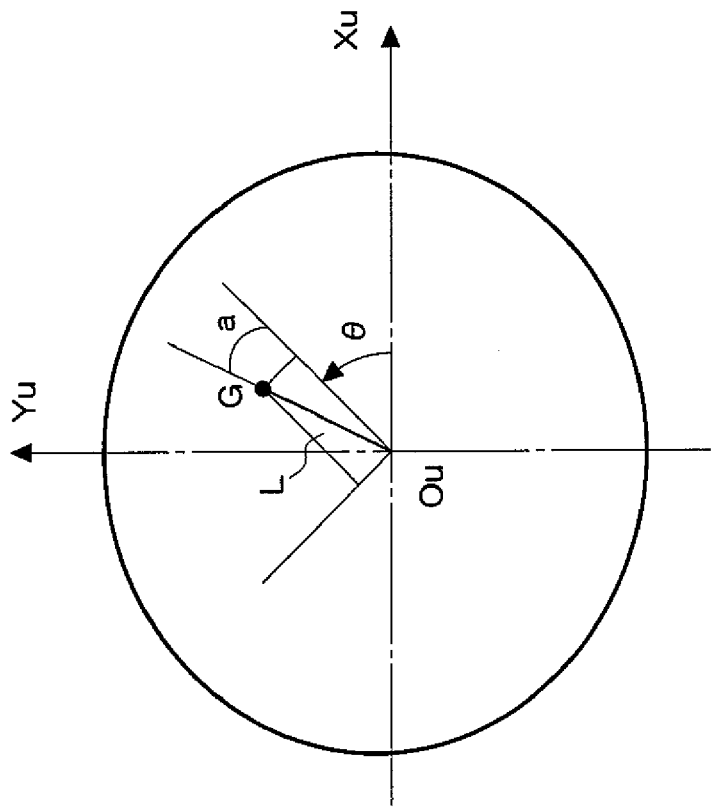
Fig. 3A (FRONT VIEW)

AXIS-OF-ROTATION POSITION CONTROL DEVICE

CROSS-REFERENCE TO RELATED APPLICATIONS

This application claims priority to Japanese Patent Application No. 2007-003064 filed on Jan. 11, 2007, which is incorporated herein by reference in its entirety.

BACKGROUND OF THE INVENTION

1. Field of the Invention

The present invention relates to a position control device applied to the axis of rotation of a numerical control machine.

2. Description of the Related Art

FIGS. 3A and 3B are a diagram showing an example of a mechanical model of an axis of rotation that is a control target plant. A rotary table 50 is rotated at an angle of rotation $\theta$ about a Zu axis by a servo motor (not shown). The point of intersection between the Zu axis and a rotational locus plane described by a center of gravity G of the rotary table 50 is represented by an origin point Ou, an Xu axis is taken in a perpendicular direction with respect to gravity on the rotational locus plane, and a remaining Yu axis is taken so as to form a right-handed coordinate system with the Zu axis and the Xu axis.

The center of gravity G is at a distance L from the origin point Ou and is in the position of angle a when $\theta=0$. Various types of jigs/tools and workpieces are placed on the rotary table 50 according to respective machining processes, so that the load state changes and the position of the center of gravity G also fluctuates. Note that g represents gravitational acceleration, and angle b is an angle formed between the Yu axis and a plane perpendicular to the direction of gravity.

FIG. 4 is a block diagram showing an example of a conventional position control device 200 for controlling the aforementioned angle of rotation $\theta$ of the axis of rotation to a position command value $\theta c$ generated in a precedence device (not shown).

This device has a feedforward configuration to increase the velocity of command response. Specifically, the position command value $\theta c$ is temporally differentiated by a differentiator 54 to become a velocity feedforward Vf, and Vf is temporally differentiated by a differentiator 55 to become an acceleration feedforward Af. A gain Cb in an amplifier Cb is a constant that determines an acceleration and deceleration torque feedforward $\tau f$ corresponding to a motor torque converted to axis of rotation for generating the acceleration Af in the axis of rotation. Ordinarily, Cb corresponds to the sum of the moment of inertia of a transmission system including a motor, which moment of inertia has been axis-of-rotation-converted, and the moment of inertia of the rotary table 50 by itself having no objects placed thereon.

The feedforward configuration of the conventional position control device is as follows. First, the angle of rotation $\theta$ detected by an angle-of-rotation detector (not shown) is subtracted from the position command value $\theta c$ by a subtractor 51, and position error that is the output thereof is amplified by a position error amplifier Gp. Moreover, the output thereof is added to the velocity feedforward Vf by an adder 52 to become a velocity command value Vc. A subtractor 53 subtracts, from the velocity command value Vc, an angle-of-rotation velocity $\omega$ in which the angle of rotation $\theta$ has been differentiated by a differentiator 56, and velocity error that is the output thereof is ordinarily proportionally integrally amplified by a velocity error amplifier Gv. This output and the acceleration and deceleration torque feedforward $\tau f$ are added together by an adder 57 to become an axis-of-rotation-converted torque command value $\tau c$, which is Ct-amplified by a power amplifier Ct. Ct is a constant determined in accordance with the servo motor characteristic, this output $\tau$ becomes the axis-of-rotation-converted generated torque of the servo motor, and the rotary table 50 is driven.

As described above, in the conventional position control device, an overall configuration where feedforward control is added with respect to a nominal linear characteristic is employed to increase the speed of command response as feedback control for compensating for a nonlinear characteristic resulting from gravity and assuring interior stability of the control system. However, as mentioned above, because various types of different jigs/tools and workpieces are placed on the rotary table, the moment of inertia increases over that of the table by itself and the center of gravity changes. When this happens, the acceleration and deceleration torque feedforward $\tau f$ is insufficient, the feedback control band is reduced, and the nonlinear characteristic resulting from gravity increases, so that controllability deteriorates, leading to a drop in positioning performance and response variations resulting from the positioning angle during positioning.

Further, because these fluctuation factors cannot be grasped, acceleration constraints and velocity constraints resulting from centrifugal force for function-generating the position command value $\theta c$ have been unable to be judged on the part of the precedence device. As a result, efficient function generation has not been possible. Moreover, during direct drive application that does not have a deceleration mechanism, the aforementioned fluctuation factors experience a relative increase, tending to make these problems even greater.

SUMMARY OF THE INVENTION

In view of these problems in the related art, an object of the present invention is to provide a position control device where feedback control and feedforward control that can appropriately respond to changes in moment of inertia and center of gravity are configured.

The position control device of the present invention determines, from error between actual motion of an axis of rotation of a numerical control machine that is a control target and motion calculated by an identification model where the control target is represented by a mathematical model, each parameter of the identification model and corrects input to the control target on the basis of these parameters.

The identification model is a motion equation that describes the motion of the axis of rotation, and comprises a term pertaining to angular acceleration and a term pertaining to angle of rotation. With respect to this identification model, the position control device identifies the parameters of the identification model on the basis of the actual angular acceleration and angle of rotation of the axis of rotation of the control target and a torque command value with respect to the numerical control machine. Additionally, the position control device uses the identified parameters to correct the torque command value and perform control conforming to the current condition of the control target.

In particular, in the position control device of the present invention, the identification model includes the term pertaining to angle of rotation. Thus, the position control device can correct the torque command value in correspondence to the load that fluctuates with the angle of rotation. For example, when the center of gravity of the control target shifts from the axis line of rotation and that axis line is not vertical, the load fluctuates with the angle of rotation because of gravity acting on the center of gravity. Even with such a control target, the position control device can execute control that follows load fluctuation.

BRIEF DESCRIPTION OF THE DRAWINGS

FIGS. 3A and 3B are a general mechanical model of an axis of rotation that is a target plant.

DETAILED DESCRIPTION OF THE INVENTION

Figure 1:
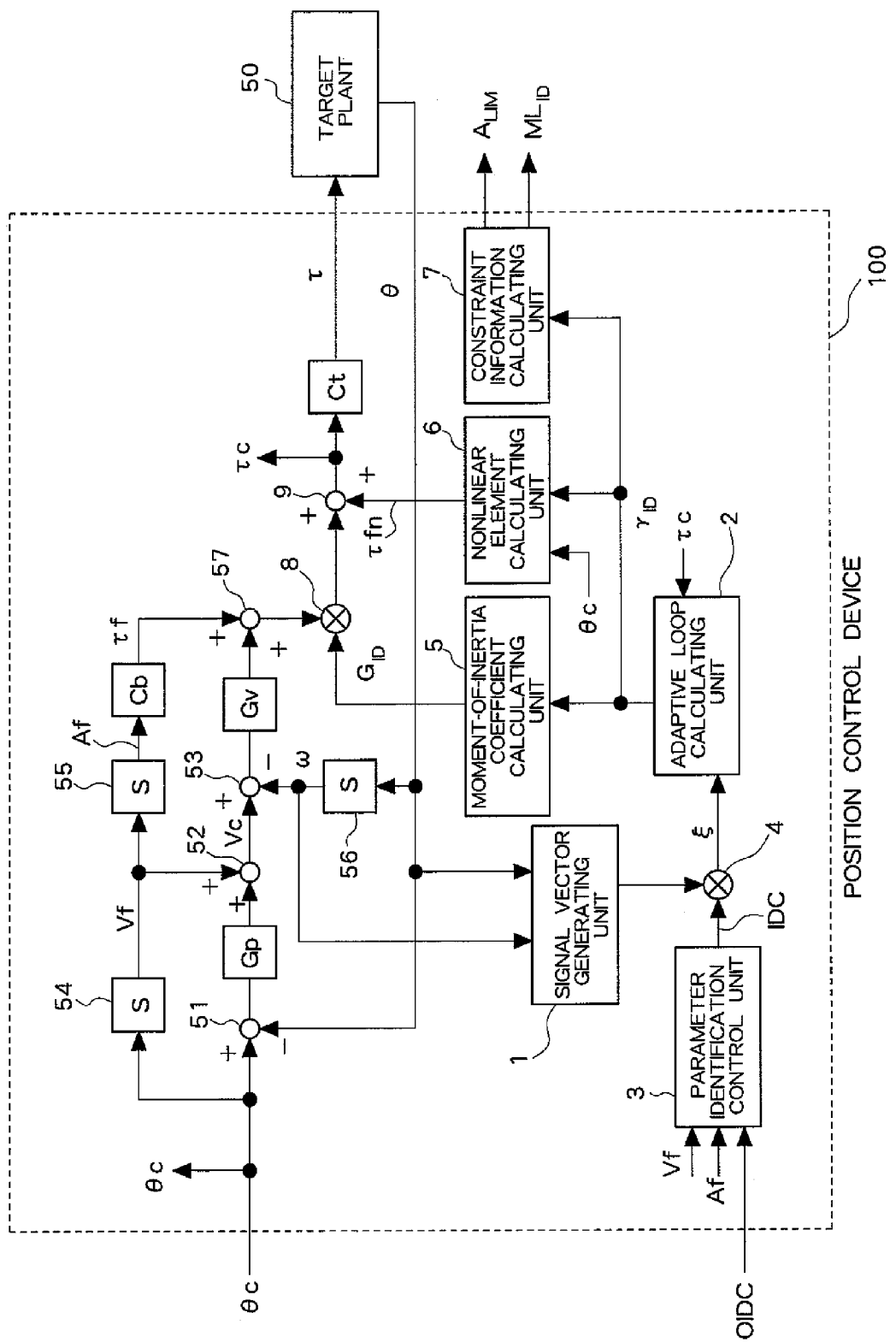
FIG. 1 is a block diagram showing the configuration of a position control device of an axis of rotation of an embodiment of the present invention.

Below, an embodiment of the present invention will be described with reference to the drawings.

With respect to the target plant of FIGS. 3A and 3B, the motion equation thereof is derived. In this case, it suffices for the angle of rotation θ to be taken as the generalized coordinate system, and a motion equation (1) is obtained.

$$\tau = (ML^2 + Iz + Im)(d\omega/dt) + M \cdot g \cdot L \cdot \text{SIN } b \cdot \text{COS}(\theta + a) \quad (1)$$

Here, M is the mass of the entire rotary table including the various types of jigs/tools and workpieces that have been placed thereon and fixed thereto, Iz is the moment of inertia of the entire rotary table about an axis parallel to the Zu axis running through the center of gravity G, and Im is the axis-of-rotation-converted moment of inertia of the transmission system including the motor.

Now, a three-dimensional signal vector ξ and a parameter vector γ are defined by expressions (2) and (3) (hereinafter, the transposition of matrix and vectors will be represented by appending the superscript "$T$").

$$\xi = [d\omega/dt, \text{COS } \theta, -\text{SIN } \theta]^T \quad (2)$$

$$\gamma = [ML^2 + Iz + Im, MgLSbCa, MgLSbSa]^T \quad (3)$$

(Here, Sb=SIN b, Ca=COS a, and Sa=SIN a.)

The motion of equation of expression (1) can be expressed by the actual system model of expression (4).

$$\tau = C t \tau c = \xi^T \gamma \quad (4)$$

Figure 4:
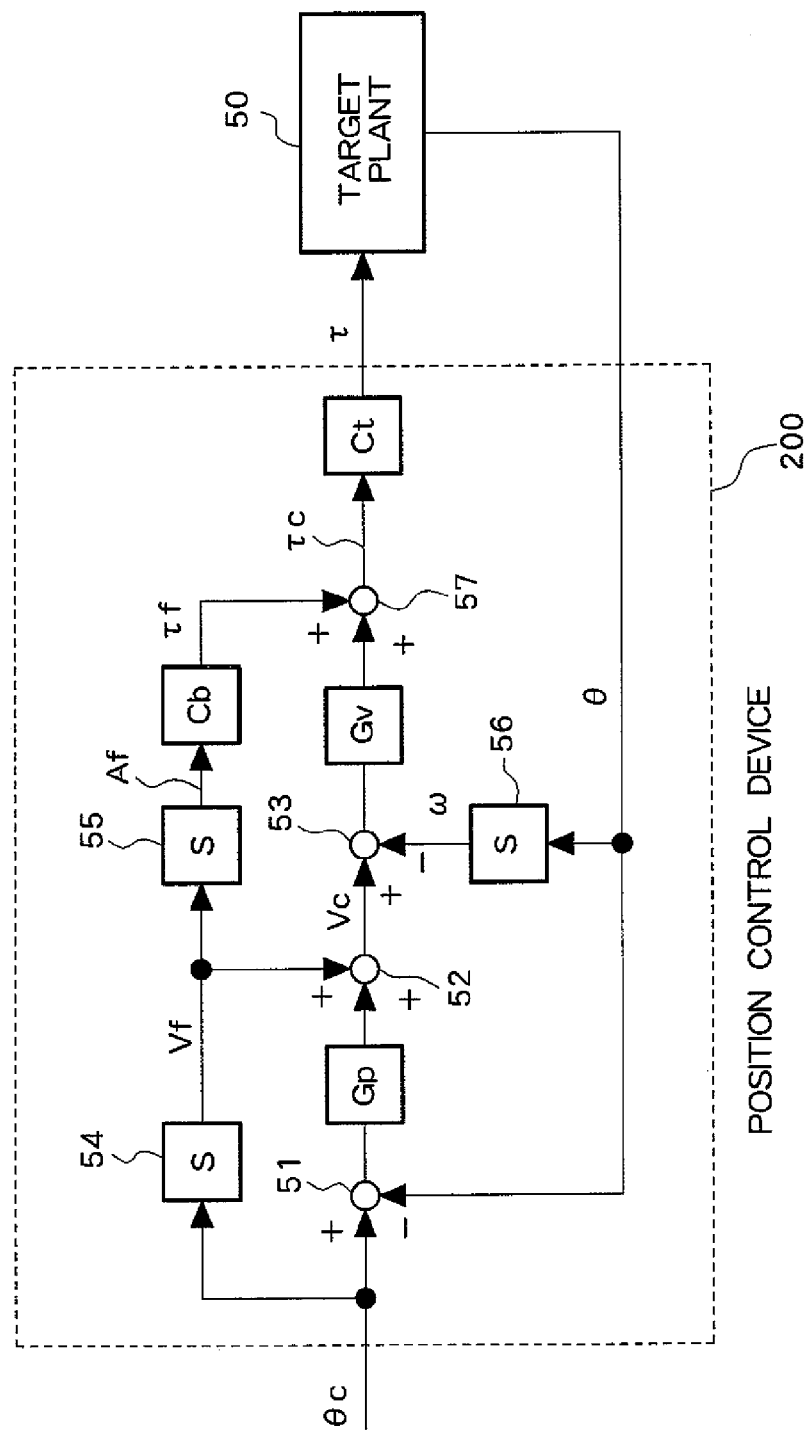
FIG. 4 is a block diagram showing an example configuration of a conventional position control device of an axis of rotation.

FIG. 1 is a block diagram showing the configuration of a position control device 100 according to the present invention. Note that, in this block diagram, the same names and reference numerals are assigned to portions that are the same as those in FIG. 4 (conventional example), and repeated description thereof is omitted. An adaptive loop calculating unit 2 is a block that calculates an identification parameter vector $\gamma_{ID}$ that is an estimate value of the parameter vector γ from the torque command value τc and the signal vector ξ.

Figure 2:
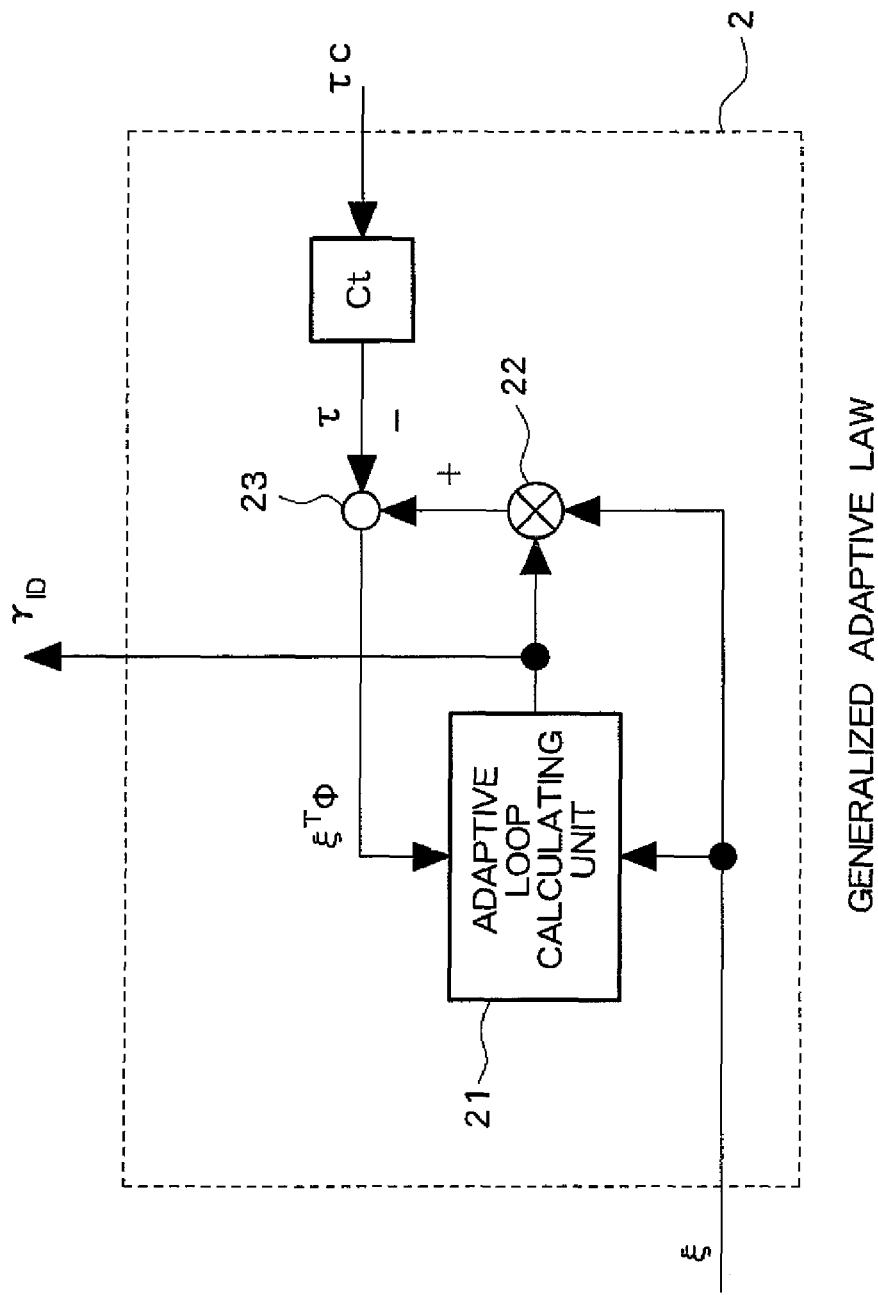
FIG. 2 is a block diagram describing the configuration of an adaptive loop calculating unit of the embodiment.

FIG. 2 is a block diagram showing the configuration of the adaptive loop calculating unit 2. A generalized adaptive law 21 calculates the identification parameter vector $\gamma_{ID}$ by known expressions (5) and (6) (*Introduction to Robust Adaptive Control*, published by Ohmsha, p. 62, etc.). (Hereinafter, (k) will represent the signal of the $k^{th}$ cycle in a time-series signal per certain sampling time.)

$$\gamma_{ID}(k) = \gamma_{ID}(k-1) - P(k-1) \cdot \xi(k) \cdot \xi(k)^T \Phi(k) \quad (5)$$

$$P(k)^{-1} = C_1(k) \cdot P(k-1)^{-1} + C_2(k) \cdot \xi(k) \xi(k)^T \quad (6)$$

Here, $0 < C_1(k) \leq 1$, $0 \leq C_2(k) < 2$, $P(0) > 0$.

The signal vector ξ(k) and the identification parameter vector $\gamma_{ID}$(k) are multiplied by a multiplier 22 to obtain a scalar signal $\xi(k)^T \gamma_{ID}(k)$. The signal equal to that obtained when the generated torque τ(k) of the servo motor is subtracted by a subtractor 23 from this scalar signal $\xi(k)^T \gamma_{ID}(k)$ is a following scalar error $\xi(k)^T \Phi(k)$ In other words, the following scalar error $\xi(k)^T \Phi(k)$ can be expressed by expression (7) using also expression (5), and can thus be calculated utilizing $\gamma_{ID}(k-1)$ of one cycle prior.

$$\xi(k)^T \Phi(k) = \xi(k)^T \gamma_{ID}(k) - \tau(k) \quad (7)$$
$$= \xi(k)^T \{\gamma_{ID}(k-1) - P(k-1) \cdot \xi(k) \cdot \xi(k)^T \Phi(k)\}$$

Here, matrix K(k) of expression (8) where the signal vector $\xi(k)^T$ is arranged in a row direction in a time series will be considered.

$$K(k) = [\xi(1), \xi(2), \ldots, \xi(k)]^T \quad (8)$$

It is known that when matrix K(k) is continuously column full rank, k→∞, $\gamma_{ID}(k) \to \gamma$, and parameter identification is established, and when the change in the parameter vector γ is sufficiently slower than convergence response, the identification parameter vector $\gamma_{ID}(k)$ following the change is obtained.

In expression (6), because P(k)>0 is assured for an arbitrary value of k, the singular value σ(P(k)) of P(k) matches the eigenvalue λ(P(k)). For this reason, when the matrix K(k) of expression (8) continues to lose column full-rankness from a certain timing on, when $C_1(k) < 1$, expression (6) means that λmax(P(k))→∞. Because this means that a certain element {pij} of P(k)→∞, this eventually leads to P(k) becoming incalculable. From the above, it will be understood that, even when matrix K(k) continues to lose column full-rankness, P(k) remains bounded, and $C_1(k) \to 1$ is equivalent.

In this example, a constant trace algorithm is utilized within the known generalized adaptive law. This is because, since tr[P(k)]>λmax(P(k)), P(k) can remain bounded when controlled as tr[P(k)]=tr[P(0)]:(certain value) by an arbitrary k. For this, $C_1(k)$ is determined by expression (9).

$$C_1(k) = 1 - [|P(k-1)\xi(k)|^2 / \{C + \xi(k)^T P(k-1)\}] \cdot [1/tr\{P(0)\}] \quad (9)$$

Here, $C = C_1(k)/C_2(k)$:(certain value)>0.5.

Then, because P(k) remains bounded even when matrix K(k) continues to lose column full-rankness for the aforementioned reason, $C_1(k) \to 1$ and $P(k-1)\xi(k) \to 0$ from expression (9); thus, it will be understood that parameter identification operation of expression (5) stops. Conversely, when matrix K(k) recovers its column full-rankness, λmax(P(k)) becomes smaller from expression (6) and tr{P(k)} is constant, so other eigenvalues become larger. Then, in expression (9), $C_1(k)$ becomes smaller than 1, and parameter identification operation of expression (50) is recovered and executed.

Returning to FIG. 1, operation of the present embodiment will be described. A signal vector generating unit 1 performs trigonometric function calculation with respect to the angle of rotation θ, calculates COS θ and −SIN θ, differentiates the angle-of-rotation velocity ω, and determines dω/dt. In other words, the signal vector generating unit 1 becomes a block that generates a source signal of the signal vector ξ in expression (2). Here, this output is multiplied by a multiplier 4 with a binary (1 or 0) output IDC of a parameter identification control unit 3 and becomes a signal vector ξ that is the input of an adaptive loop calculating unit 2.

Next, operation of the parameter identification control unit 3 will be described. The motion equation (1) does not include error and disturbance applied to the target plant. For this reason, when disturbance and error are present, error occurs in the identification result. Further, when matrix K(k) of expression (8) cannot ensure column full-rankness, parameter identification operation does not function, so in the signal vector ξ of expression (2), dω/dt≠0 becomes a necessary condition of parameter identification. Moreover, as for the power amplifier Ct in FIG. 1, controllability drops when the angle-of-rotation velocity ω becomes larger, and it becomes difficulty for power amplification of Ct times to be accurately realized.

From the above, the parameter identification control unit 3 applies the logical expressions of set expression (10) to expression (12) with respect to the velocity feedforward Vf, the acceleration feedforward Af, and the parameter identification control binary signal OIDC from the precedence device, outputs the binary signal IDC, and controls execution/stopping of parameter identification operation. When expression (12) is satisfied, 1 is output as IDC.

$$cond1=(0<Vf\leq Vmax)\cap(o<Af) \qquad (10)$$

$$cond2=(-Vmax\leq Vf<0)\cap(Af<0) \qquad (11)$$

$$IDC=(cond1 \cup cond2)\cap OIDC \qquad (12)$$

Here, Vmax (>0) is a velocity limit value with which the power amplifier Ct accurately performs power amplification of Ct times, cond1 extracts a plus direction acceleration state, and cond2 extracts a minus direction acceleration state. A deceleration state causes identification operation to stop such that control parameters (later-described $G_{ID}$ and τfn) do not change during positioning. As for the parameter identification control binary signal OIDC, there is processing and contact from the outside environment with the rotary table 50, and when it is presumed that disturbance will be applied, parameter identification operation can be stopped by outputting 0 from the precedence device.

A first element of the identification parameter vector $γ_{ID}$ of the adaptive loop calculating unit 2 becomes an identification value $(ML^2+Iz+Im)_{ID}$ of the moment of inertia of the motion equation (1) in the target plant from expression (3). A moment-of-inertia coefficient calculating unit 5 uses this as input to output a moment-of-inertia coefficient $G_{ID}$ by expression (13).

$$G_{ID}=(ML^2+Iz+Im)_{ID}/(Cb \cdot Ct) \qquad (13)$$

The moment-of-inertia coefficient $G_{ID}$ is multiplied, by a multiplier 8, by an output of an adder 57. For this reason, the acceleration and deceleration torque feedforward τf becomes an appropriate amount corresponding to the linear portion of the first term on the right side in the motion equation (1).

Further, when Gv(s) represents the transmission characteristic of a velocity error amplifier Gv that has been initially set in correspondence to the moment of inertia of the transmission system including the motor and the rotary table 50 alone, it becomes necessary for the transmission characteristic Gv' (s) that applies a certain velocity control loop characteristic to satisfy expression (14).

$$Gv'(s)/(ML^2+Iz+Im)=Gv(s)/(Cb \cdot Ct) \qquad (14)$$

Thus, as for multiplying the moment-of-inertia coefficient $G_{ID}$ of expression (13), the transmission characteristic of the velocity error amplifier Gv becomes $G_{ID} \cdot Gv(s)$ and matches Gv'(s) of expression (14), so that the velocity control loop characteristic is made constant. In other words, the feedback control band including the position loop is made constant.

Second and third elements of the identification parameter vector $γ_{ID}$ Of the adaptive loop calculating unit 2 become $(MgLSbCa)_{ID}$ and $(MgLSbSa)_{ID}$ from expression (3). A nonlinear element calculating unit 6 performs trigonometric function calculation with respect to the position command value θc, calculates COS θc and −SIN θc, and determines nonlinear element torque compensation τf by calculation of expression (15) with the second and third elements of the identification parameter vector $γ_{ID}$.

$$τfn=(1/Ct)\{(MgLSbCa)_{ID} \cdot COS\ θc+(MgLSbSa)_{ID} \cdot (-SIN\ θc)\} \qquad (15)$$

Here, Ct·τfn can be regarded as MgLSb·COS(θc+a), so it becomes an estimate value of a second term on the right side that is a nonlinear element of the motion equation (1). Thus, by adding τfn to the output of the multiplier 8 by means of an adder 9, feedforward compensation with respect to the nonlinear element can be attained.

A constraint information calculating unit 7 performs calculation of expression (16) from the identification parameter vector $γ_{ID}$ of the adaptive loop calculating unit 2.

$$(MgLSb)_{ID}=\{(MgLSbCa)_{ID}^2+(MgLSbSa)_{ID}^2\}^{1/2} \qquad (16)$$

$(MgLSb)_{ID}$ means the maximum amplitude of the nonlinear element, so calculation of expression (17) is performed with an axis-of-rotation-converted generated torque limit value $τ_{LIM}$ of the servo motor, which is already known information.

$$A_{LIM}=\{τ_{LIM}-(MgLSb)_{ID}\}/(ML^2+Iz+Im)_{ID} \qquad (17)$$

$A_{LIM}$ represents the maximum angular acceleration that the position control device can achieve under the current load condition.

Next, because gravitational acceleration g and angle b are already known, expression (18) can be calculated from $(MgLSb)_{ID}$ of expression (16). $ML_{ID}$ can be regarded as (mass)×(distance between center of gravity and rotation central axis) under the current load condition.

$$ML_{ID}=(MgLSb)_{ID}/(gSb) \qquad (18)$$

The constraint information calculating unit 7 uses $A_{LIM}$ and $ML_{ID}$ that have been calculated as constraint information under the current load condition and outputs them to the precedence device. Function generation of the position command value θc is performed within the range of these pieces of control information.

$ML_{ID}ω^2$ that is determined from the angular velocity ω and $ML_{ID}$ output from the position control device according to the present embodiment can be regarded as centrifugal force applied to the Zu axis; that is, the rotation central axis of the rotary table 50. For this reason, the precedence device can determine the maximum angular velocity $V_{LIM}$ that can be allowed from the tolerated radial load of the drive unit, and the optimum function generation of the position command value θc corresponding to the current load condition can be performed to match the aforementioned maximum angular velocity $A_{LIM}$.

According to the present embodiment, the feedback control band is made constant with respect to fluctuations in center of gravity and moment of inertia in the axis of rotation of a numerical control machine. Additionally, with respect to linear characteristic and nonlinear characteristic, feedforward control is made appropriate, so that controllability does not deteriorate, and a drop in positioning performance and response variations resulting from the positioning angle during positioning can be alleviated. Further, acceleration constraints corresponding to the load state and velocity constraints resulting from centrifugal force can be grasped on the part of the precedence device, so optimum function generation of the position command θc becomes possible. Moreover, the control effect resulting from these becomes even more remarkable during direct drive application that does not have a deceleration mechanism.

What is claimed is:

1. A position control device that has a configuration which determines a torque command value of a servo torque by a feedback loop of position and velocity and a feedforward of velocity and acceleration and deceleration torque and controls, by a servo motor, an angle of rotation of an axis of rotation of a numerical control machine in accordance with a position command value from a precedence device, the position control device comprising:

a signal vector generating unit that generates, on the basis of actual motion of the axis of rotation, a signal vector based on the angular acceleration and angle of rotation thereof;

an adaptive loop calculating unit that performs adaptive identification from the signal vector and a torque command value of axis-of-rotation conversion with respect to an identification model based on a motion equation of a target plant including an axis of rotation comprising a term relating to the angular acceleration of the axis of rotation and a term relating to the angle of rotation and which calculates an estimate value of a parameter vector comprising an element pertaining to a coefficient of a term relating to angular acceleration of the identification model and an element pertaining to a coefficient of a term relating to angle of rotation;

a moment-of-inertia coefficient calculating unit that calculates a moment-of-inertia coefficient on the basis of the element pertaining to the coefficient of the term relating to angular acceleration in the estimate value of the parameter vector; and a nonlinear element calculating unit that calculates nonlinear element torque compensation on the basis of the element pertaining to the coefficient of the term relating to angle of rotation in the estimate value of the parameter vector and the angle of rotation of the axis of rotation, wherein the position control device corrects the torque command value by the moment-of-inertia coefficient and the nonlinear torque compensation.

2. The position control device of claim 1, further comprising a parameter identification control unit that controls whether or not to perform adaptive identification of the adaptive loop calculating unit, wherein the parameter identification control unit executes control to perform adaptive identification when the absolute value of velocity feedforward is equal to or less than a predetermined value and a value of acceleration feedforward is not 0.

3. The position control device of claim 1, further comprising a constraint information calculating unit that calculates a maximum angular velocity that the position control device is capable of reaching under current conditions on the basis of each element of the estimate value of the parameter vector and a predetermined generated torque limit value of the servo motor, and outputs this reachable maximum angular velocity to the precedence device of the position control device.

4. The position control device of claim 1, further comprising a constraint information calculating unit that calculates the product of the mass of the target plant and the distance between the center of gravity and the rotation central axis on the basis of the element pertaining to the coefficient of the term relating to angle of rotation of the estimate value of the parameter vector, gravitational acceleration, and angle of inclination of the axis of rotation and that outputs the same to the precedence device as the constraint information.

* * * * *